(12) United States Patent
Pei et al.

(10) Patent No.: US 8,490,574 B2
(45) Date of Patent: Jul. 23, 2013

(54) FILM COATING HOLDER

(75) Inventors: Shao-Kai Pei, Taipei Hsien (TW); Hou-Yao Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 358 days.

(21) Appl. No.: 12/898,638

(22) Filed: Oct. 5, 2010

(65) Prior Publication Data

US 2011/0259267 A1    Oct. 27, 2011

(30) Foreign Application Priority Data

Apr. 26, 2010  (TW) .............................. 99113013 A

(51) Int. Cl.
*B05C 13/00*  (2006.01)
*B05C 13/02*  (2006.01)

(52) U.S. Cl.
USPC ......................................................... 118/500

(58) Field of Classification Search
None
See application file for complete search history.

(56) References Cited

U.S. PATENT DOCUMENTS

| | | | | |
|---|---|---|---|---|
| 3,825,456 A | * | 7/1974 | Weber et al. | 216/56 |
| 5,695,817 A | * | 12/1997 | Tateyama et al. | 427/240 |
| 5,803,970 A | * | 9/1998 | Tateyama et al. | 118/319 |
| 2009/0038544 A1 | * | 2/2009 | Chen et al. | 118/50 |
| 2009/0229514 A1 | * | 9/2009 | Wang et al. | 118/500 |
| 2010/0224483 A1 | * | 9/2010 | Cho | 204/222 |
| 2010/0265599 A1 | * | 10/2010 | Lin et al. | 359/823 |

* cited by examiner

*Primary Examiner* — Dah-Wei Yuan
*Assistant Examiner* — Jethro Pence
(74) *Attorney, Agent, or Firm* — Altis Law Group, Inc.

(57) ABSTRACT

A film coating holder includes a top cover, a plurality of annular parts, and a plurality of connecting pieces. The top cover defines a plurality of first holes for receiving workpieces therein. The plurality of annular parts is stacked on each other with progressively increasing radiuses. Each of the plurality of annular parts defines a plurality of second holes for receiving the workpieces, and the top cover is positioned on the annular part with a minimum radius. The plurality of connecting pieces connects the annular part with the minimum radius to the top cover and connects each two adjacent annular parts together.

13 Claims, 4 Drawing Sheets

FILM COATING HOLDER

BACKGROUND

1. Technical Field

The present disclosure relates to film coating devices and, particularly, to a film coating holder.

2. Description of Related Art

Generally, in a film coating process for workpieces (e.g., lenses), the workpieces are placed on an umbrella-shaped film coating holder. The film coating holder is integrally formed and cannot be disassembled into smaller parts. Because of the large size, the film coating holder is inconvenient for transportation, manufacturing, storing and repairing. Thus, what is needed is a film coating holder which overcomes the shortcomings mentioned above.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present disclosure.

DETAILED DESCRIPTION

Figure 1:
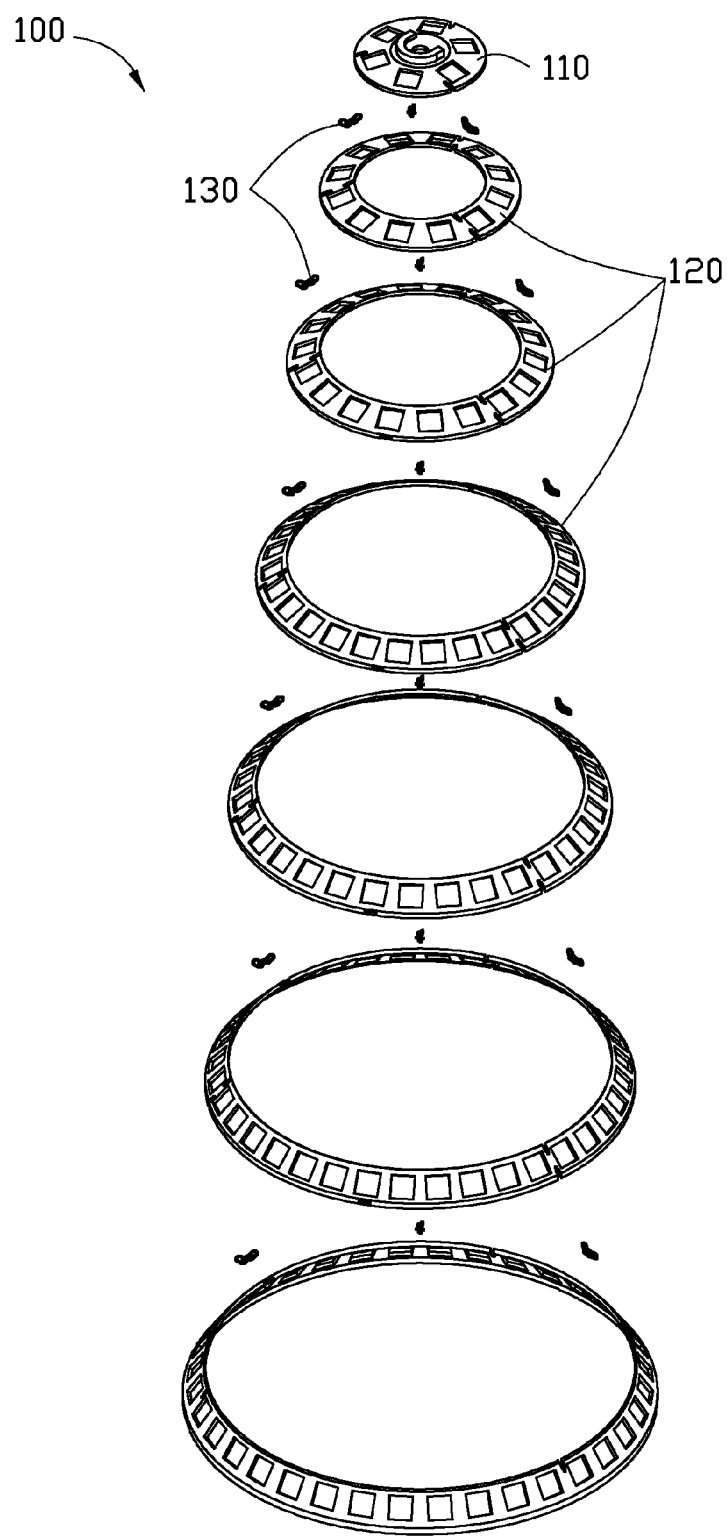
FIG. 1 is a schematic, exploded view of a film coating holder according to an exemplary embodiment.
Figure 2:
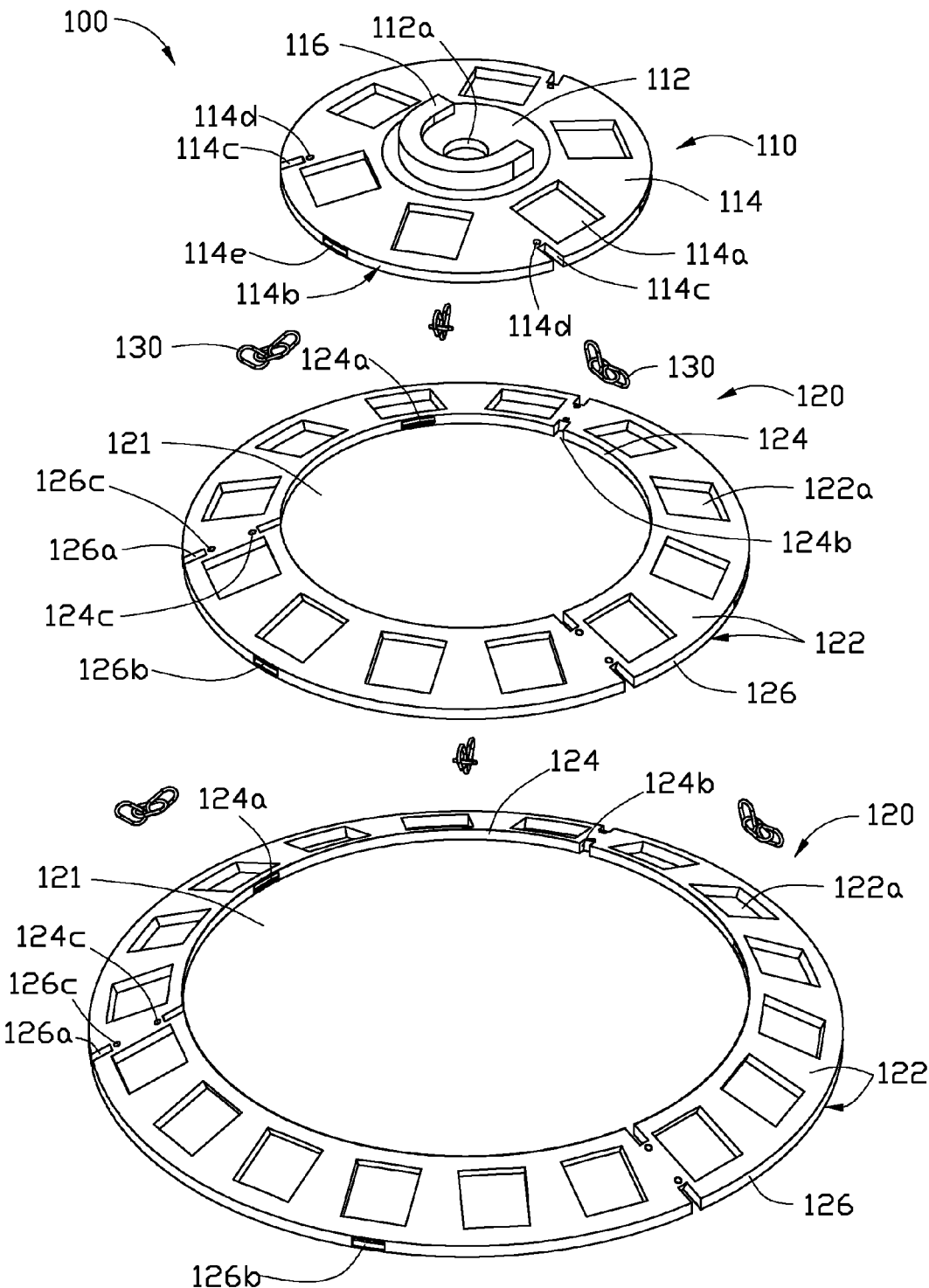
FIG. 2 is a partial, enlarged view of FIG. 1, showing the top three parts of the film coating holder.
Figure 3:
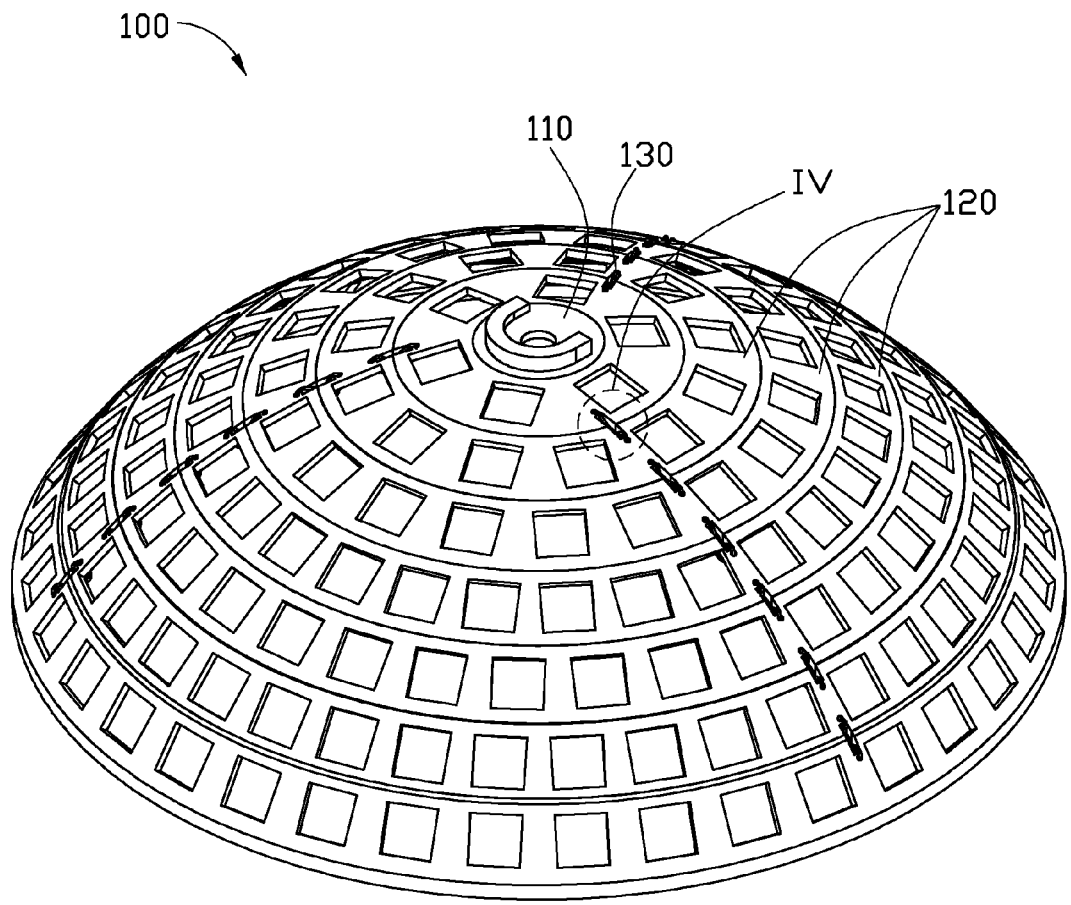
FIG. 3 is an assembled view of the film coating holder of FIG. 1.
Figure 4:
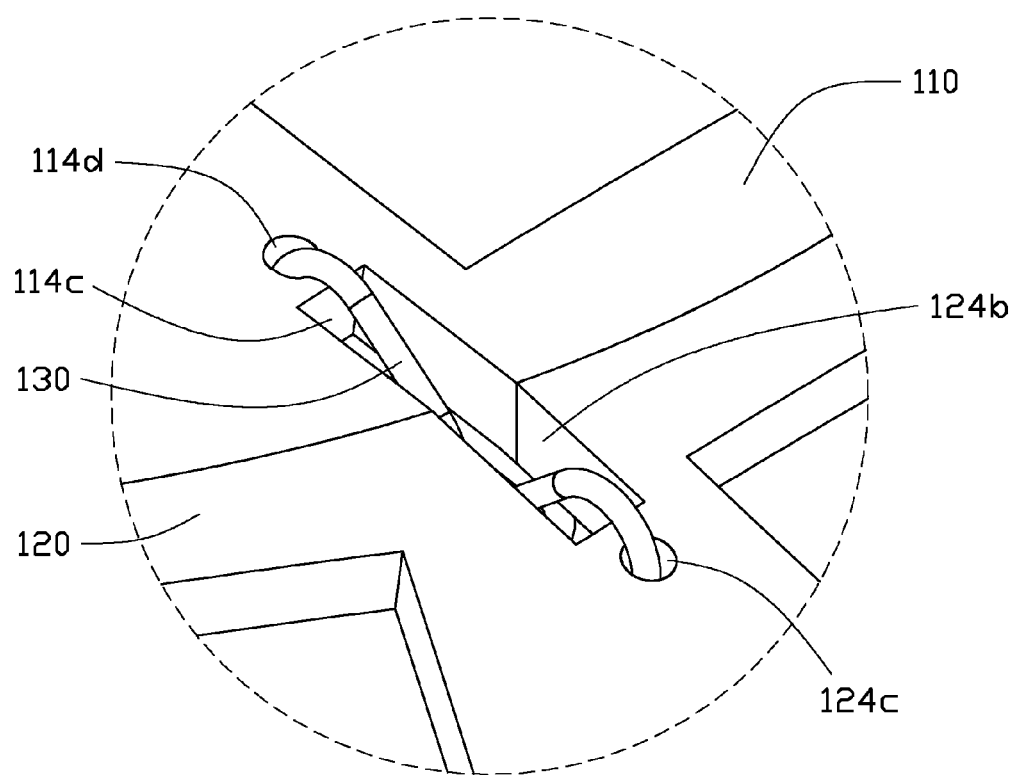
FIG. 4 is an enlarged view of circled part IV of FIG. 3.

Referring to FIGS. 1-4, a film coating holder 100 according to an exemplary embodiment is disclosed. The film coating holder 100 includes a top cover 110, a plurality of annular parts 120, and a plurality of connecting pieces 130. The annular parts 120 are stacked onto each other with progressively increased radiuses. The top cover 110 fits over the top of one of the annular parts 120 with a minimum radius. The top cover 110 and the plurality of annular parts 120 are connected by the connecting pieces 130.

The top cover 110 is a round plate-like component, and includes a central section 112, an outer section 114 coaxially surrounding the central section 112, and a U-shaped yoke 116. The central section 112 defines a shaft hole 112a for receiving a rotating shaft of a power source. The yoke 116 is projected from the central section 112 and surrounds the shaft hole 112a for protecting the rotating shaft. The outer section 114 defines a plurality of first holes 114a for receiving workpieces, a plurality of first fixing holes 114d, and a plurality of first slots 114c. The first holes 114a and the first fixing holes 114d are evenly spaced around the shaft hole 112a respectively. Each of the first slots 114c is positioned adjacent to a corresponding one of the first fixing holes 114d and extends to an outer surface 114b of the top cover 110. A plurality of first mortises 114e is defined in the outer surface 114b. Each of the first mortises 114e is positioned between two of the first slots 114c.

Each of the annular parts 120 has similar shape and configuration. Each annular part 120 is shaped as an annular part of a dome and defines a central opening 121 thereon. The annular part 120 includes two opposite surfaces 122, an inner surface 124 defining the central opening 121 and an outer surface 126 opposing the central opening 121. The annular part 120 defines a plurality of second holes 112a on the surface 122 for receiving the workpieces therein, a plurality of second slots 124b in the inner surface 124, a plurality of second fixing holes 124c adjacent to the inner surface 124, a plurality of third slots 126a, and a plurality of third holes 126c adjacent to the outer surface 126. Each of the second slots 124b is positioned adjacent to a corresponding one of the second fixing holes 124c. Each of the third slots 126a is adjacent to one of the third fixing holes 126c and extends to the outer surface 126. A plurality of tenons 124a is projected outwardly from the inner surface 124. Each tenon 124a is made from an elastic material. Each of the tenons 124a is positioned between two second slots 124b. A plurality of second mortises 126b is defined in the outer surface 126. Each of the second mortises 126b is positioned between two third slots 126a.

Each connecting piece 130 includes a plurality of binder rings connected to each other. The binder rings are unclosed rings made of metal material which has rigidity and elasticity. By applying a central opening force, the binder rings can open and enter the first fixing holes 114d, the second fixing holes 124c, or the third fixing holes 126c, thus to connect the top cover 110 and the annular parts 120 together.

When assembling, the annular part 120 with the minimum radius receives the top cover 110 in the central opening 121, the tenons 124a of the annular part 120 with the minimum radius plug into the first mortises 114e of the top cover 110, the first slots 114c of the top cover 110 are aligned with the second slots 124b of the annular part 120 with the minimum radius. The annular part 120 with the minimum radius is connected to the top cover 110 by the connecting pieces 130 received in the corresponding first slots 114c and the second slots 124b. Two binder rings positioned at two opposite ends of one connecting piece 130 respectively enter the first fixing hole 114d and the second fixing hole 124c, thus to connect the top cover 110 with the annular part 120.

All of the annular parts 120 fit over each other sequentially by the same means described above. In each two adjacent annular parts 120, the tenons 124a of the annular part 120 with a bigger radius plug into the second mortises 126b of the annular part 120 with a smaller radius. The second slots 124b of the annular part 120 with the bigger radius are aligned with the third slots 126a of the annular part 120 with the smaller radius for receiving the connecting pieces 130, two binder rings positioned at two opposite ends of one connecting piece 130 enter the third fixing holes 126c of the annular part 120 with the smaller radius and the second fixing holes 124c of the annular part 120 with the bigger radius, thus to connect the two adjacent annular parts 120.

When disassembling, disconnect the connecting pieces 30 from the top cover 110 and the annular parts 120, then disconnect the annular parts 120 and the top cover 110. In this way, the film coating holder 100 can be disconnected to several small parts for easily storage and transportation.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A circular film coating holder comprising:

a top cover defining a plurality of first holes for receiving workpieces;

a plurality of annular parts stacked on each other with progressively increasing radiuses, wherein each of the plurality of annular parts defines a plurality of second holes for receiving the workpieces, the top cover is positioned on the annular part with a minimum radius, and the width of each of the annular parts from an inner surface to an outer surface is the same as each other, wherein the inner surface is the surface which connects to a preceding annular part and the outer surface is the surface which connects to a subsequent annular part; and a plurality of connecting pieces connecting the annular part with the minimum radius to the top cover and connecting each two adjacent annular parts together.

2. The circular film coating holder of claim 1, wherein the top cover comprises a central section and an outer section surrounding the central section, the central section defines a shaft hole, and the first holes are evenly defined on the outer section.

3. The circular film coating holder of claim 2, wherein the top cover further comprises a yoke projected from the central section and surrounding the shaft hole.

4. The circular film coating holder of claim 2, wherein the top cover defines a plurality of first fixing holes, each of the annular parts defines a central opening, a plurality of second fixing holes adjacent to an inner surface of the central opening and a plurality of third fixing holes adjacent to an outer surface thereof.

5. The circular film coating holder of claim 4, wherein two ends of one connecting piece enter the first fixing holes of the top cover and the second fixing holes of the annular part with the minimum radius, thus to connect the top cover to the annular part with the minimum radius.

6. The circular film coating holder of claim 4, wherein in each two adjacent annular parts, two ends of another connecting piece enter the third fixing holes of the annular part with a smaller radius and the second fixing holes of the annular part with a bigger radius, thus to connect the two adjacent annular parts.

7. The circular film coating holder of claim 1, wherein the top cover defines a first outer surface and a plurality of first mortises on the outer surface thereof, each of the plurality of annular parts has an inner surface defining a central opening, and an second outer surface far from the central opening, a plurality of second mortises is defined in the second outer surface, each annular part comprises a plurality of tenons projected from the inner surface thereof.

8. The circular film coating holder of claim 7, wherein the tenons of the annular part with the minimum radius plug into the first mortises of the top cover.

9. The circular film coating holder of claim 7, wherein in each two adjacent annular parts, the tenons of the annular part with a bigger radius plug into the second mortises of the annular part with a smaller radius.

10. The circular film coating holder of claim 1, wherein the top cover is round shaped.

11. The circular film coating holder of claim 4, wherein the top cover defines a plurality of first slots positioned adjacent to a corresponding one of the first fixing holes and extending to an outer surface of the top cover, each of the annular parts defines a plurality of second slots and a plurality of third slots, each of the second slots is defined in the inner surface of the central opening and adjacent to a corresponding one of the second fixing holes, and each of the third slots is defined in the outer surface thereof and adjacent to a corresponding one of the third fixing holes.

12. A circular film coating holder comprising:

a top cover comprising a central section and an outer section surrounding the central section, the central section defining a shaft hole, the outer section defining a plurality of first holes for receiving workpieces, the top cover defining a plurality of first fixing holes and a plurality of first slots, each of the first slots positioned adjacent to a corresponding one of the first fixing holes and extending to an outer surface of the top cover;

a plurality of annular parts stacked on each other with progressively increasing radiuses, each of the annular parts defining a central opening, a plurality of second holes for receiving the workpieces, a plurality of second fixing holes adjacent to an inner surface of the central opening, a plurality of third fixing holes adjacent to an outer surface thereof, a plurality of second slots and a plurality of third slots, each of the second slots defined in the inner surface of the central opening and adjacent to a corresponding one of the second fixing holes, and each of the third slots defined in the outer surface of a respective one of the annular parts and adjacent to a corresponding one of the third fixing holes, the top cover positioned on the annular part with a minimum radius; and a plurality of connecting pieces connecting the annular part with the minimum radius to the top cover and connecting each two adjacent annular parts together; wherein the first slots of the top cover are aligned with the second slots of the annular part with the minimum radius for receiving the connecting pieces.

13. A circular film coating holder comprising:

a top cover comprising a central section and an outer section surrounding the central section, the central section defining a shaft hole, the outer section evenly defining a plurality of first holes for receiving workpieces, the top cover defining a plurality of first fixing holes and a plurality of first slots, each of the first slots positioned adjacent to a corresponding one of the first fixing holes and extending to an outer surface of the top cover;

a plurality of annular parts stacked on each other with progressively increasing radiuses, each of the annular parts defining a central opening, a plurality of second holes for receiving the workpieces, a plurality of second fixing holes adjacent to an inner surface of the central opening, a plurality of third fixing holes adjacent to an outer surface thereof, a plurality of second slots and a plurality of third slots, each of the second slots defined in the inner surface of the central opening and adjacent to a corresponding one of the second fixing holes, and each of the third slots defined in the outer surface of a respective one of the annular parts and adjacent to a corresponding one of the third fixing holes, the top cover positioned on the annular part with a minimum radius; and a plurality of connecting pieces connecting the annular part with the minimum radius to the top cover and connecting each two adjacent annular parts together; wherein in each two adjacent annular parts, the second slots of the annular part with the bigger radius are aligned with the third slots of the annular part with the smaller radius for receiving the connecting pieces.

\* \* \* \* \*